Figure 1:
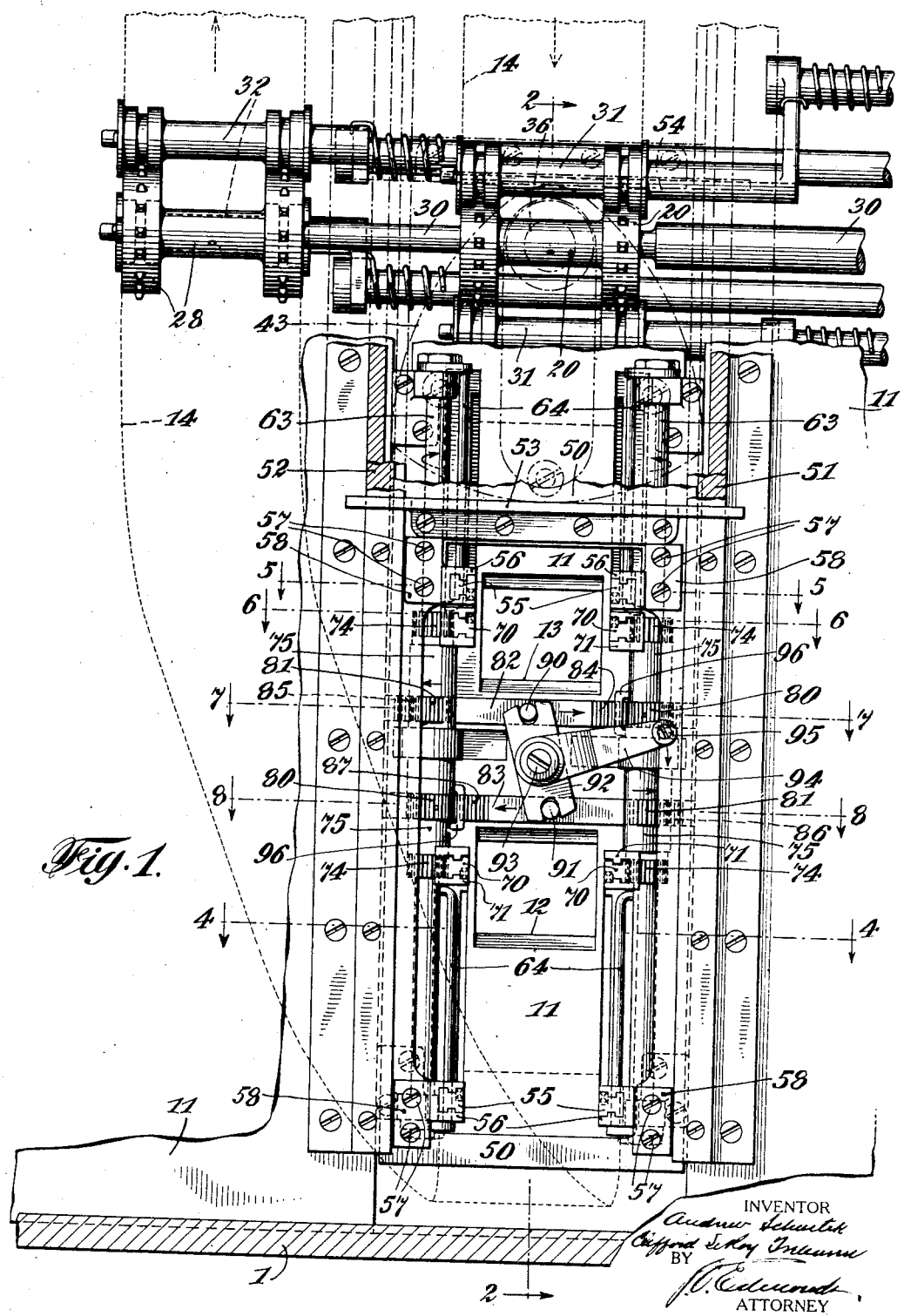

Feb. 16, 1932.  A. SCHUSTEK ET AL  1,845,062
COLOR PHOTOGRAPHY
Filed July 31, 1926  6 Sheets-Sheet 5

Feb. 16, 1932. A. SCHUSTEK ET AL 1,845,062
COLOR PHOTOGRAPHY
Filed July 31, 1926 6 Sheets-Sheet 6
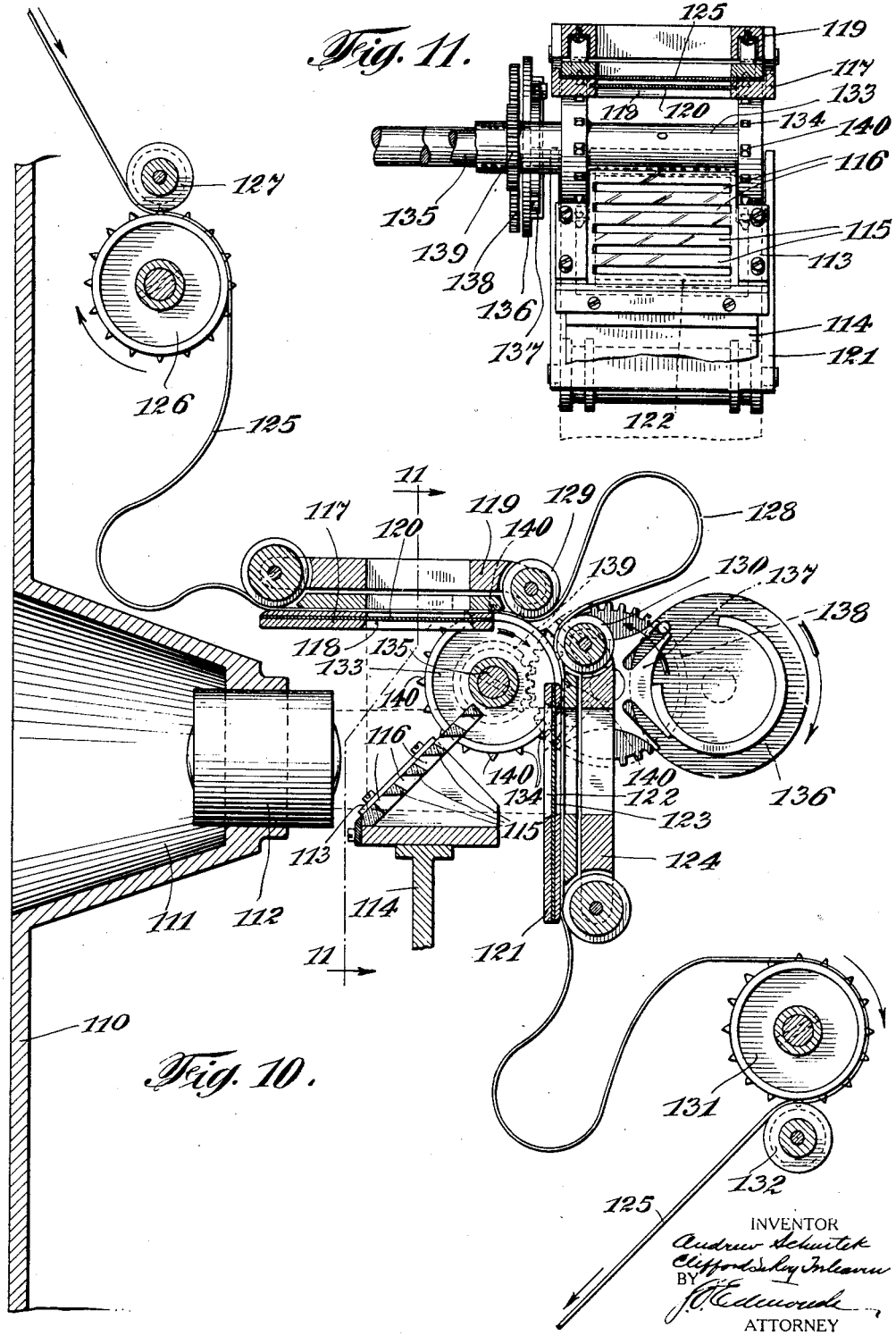

Patented Feb. 16, 1932

1,845,062

UNITED STATES PATENT OFFICE

ANDREW SCHUSTEK, OF CHICAGO, ILLINOIS, AND CLIFFORD LE ROY TRELEAVEN, OF JACKSON HEIGHTS, NEW YORK, ASSIGNORS TO COLORFILM CORPORATION, OF NEW YORK, N. Y., A CORPORATION OF DELAWARE

COLOR PHOTOGRAPHY

Application filed July 31, 1926. Serial No. 126,116.

This invention relates to color photography, and more particularly relates to a method of and camera for taking color motion pictures.

One method of color cinematography procedure comprehends the making of separate photographic negative images of different (complementary) color value aspects of the same movement phase of a scene, and projecting positives of these images, in their proper colors, in superposed relationship, to obtain a reproduction of the original scene in substantially natural colors. The positive images may be physically superposed on a film or plate, and properly colored, or the positive images may be placed on separate film areas or plates and superposed by optical projection on a screen. In the latter case, the color may either be applied directly to the film or plate, or the color may be introduced by interposing suitable color screens in the projected rays which carry the images.

It is essential that the superposed images which combine to produce a natural color reproduction of the scene can be and are brought into exact superposed registry with each other. Accordingly, it is essential also that each set of images shall comprise simultaneously photographed, geometrically like images of the same movement phase of the object field.

Heretofore faulty registration of the complemental part images has been a principal cause for the failure to obtain satisfactory color motion picture projection; and the principal object of our invention is to provide a method for obtaining such consistently exact superposition, one upon the other, of the complemental part images of the scene that objectionable projection, due to lack of exact registration of the complemental images, is entirely eliminated. The objects of this invention also include the provision of a method of placing successive sets of images having complementary color values of the same movement phase of a scene on a single negative motion picture film strip in such a way that the images of each set can be placed on a positive strip in exact registered superposition, one upon the other, irrespective of any shrinkage or extension of the negative subsequent to the time of original exposure.

Another aim of our invention is to provide a motion picture camera for making negative color motion picture films in accordance with this method.

A further object of this invention is to provide a camera, whereby each image of simultaneously exposed sets is fed into approximate exposure position and registered on the film strip independently of the other image or images of the set and independently of the images of other sets.

A further object of our invention is to provide a camera having the characteristics referred to, and whereby the images of each set are geometrically alike and are obtained simultaneously.

A further object of our invention is to provide a camera constructed to permit the use of large lenses equipped with standard iris diaphragms, without the camera being so large as to be unwieldy or inconvenient to move about and operate.

A further object of our invention is to provide a camera of the character described, which has comparatively short light paths intervening the objective aperture and the film, whereby the camera has increased covering power; that is, a wider field of view.

A further object of our invention is to provide improved means for registering film areas at a plurality of exposure gates singly and separatively.

A further object of our invention is to provide means for advancing new image spaces of the film into position for registration at the film gates in synchronism with the exposure periods and with the operation of the registration means.

A further object of our invention is to provide a camera which requires no adjustment of the film subsequent to the film being threaded up and adjusted originally in the proper manner.

Other objects of our invention will be in part obvious and in part pointed out hereinafter.

Briefly stated, the camera is provided with two exposure gates and with means for advancing the film across these gates simultaneously, with an intermittent motion, a plurality of picture spaces at each advance; with means for maintaining an extent of film, embracing any even number of picture space, loosely between the exposure gates; with means for registering each picture space advanced to each gate separately and independently of the other, sufficient play in the film being maintained for this purpose by the loose film which is maintained intermediate the two gates; and with means for synchronizing these means with each other and with the exposure means. The camera is also equipped with means for photographing simultaneously on the respective film space of each set simultaneously registered at the gates, geometrically like images of the object filled taken from the same point of view through optically like paths.

The free loop intermediate the two gates may comprise any even number of picture spaces, and is maintained throughout the entire exposure of the reel. The camera operates to bring sets of picture spaces successively to the gates for simultaneous exposure thereat, each space of the sets being moved separately and independently; then to register the film separately and independently at each gate in such a way that every image will have exactly the same position with respect to an adjacent perforation on the film; then to simultaneously expose each two spaces of the film so registered, after which the film is advanced a distance of two picture spaces across each gate, then the newly placed film spaces are registered at each gate, the exposure made simultaneously at each gate, and this cycle of operation repeated so long as the camera mechanism is actuated or until the film has been exposed to the extent desired.

In making the positive or positives from this negative, each negative image may be projected onto the positive in such a way that the positive images will all have exactly the same relative position with respect to perforations on the positive film or films as the negative images have relatively to the perforations of the negative film. Thus, each set of positive images may readily and easily be obtained in exact superposition on the same area of the positive film, and if the images of each set are placed on separate positive films, these sets may be readily and easily brought into exact superposed registry on the screen by merely adjusting the corresponding perforations in the films into corresponding engagement with the sprockets of the projecting apparatus. Obviously, with a negative produced by our method, complemental negatives, or complemental positives and negatives, may be superposed one upon the other in exact registration on a film or plate, or an screen. Either optical or contact printing may be employed to transfer an image from one film or plate to another.

In order that a clearer understanding of our invention may be had, attention is hereby directed to the accompanying drawings, forming a part of this application and illustrating certain possible embodiments of our invention.

Figure 2:
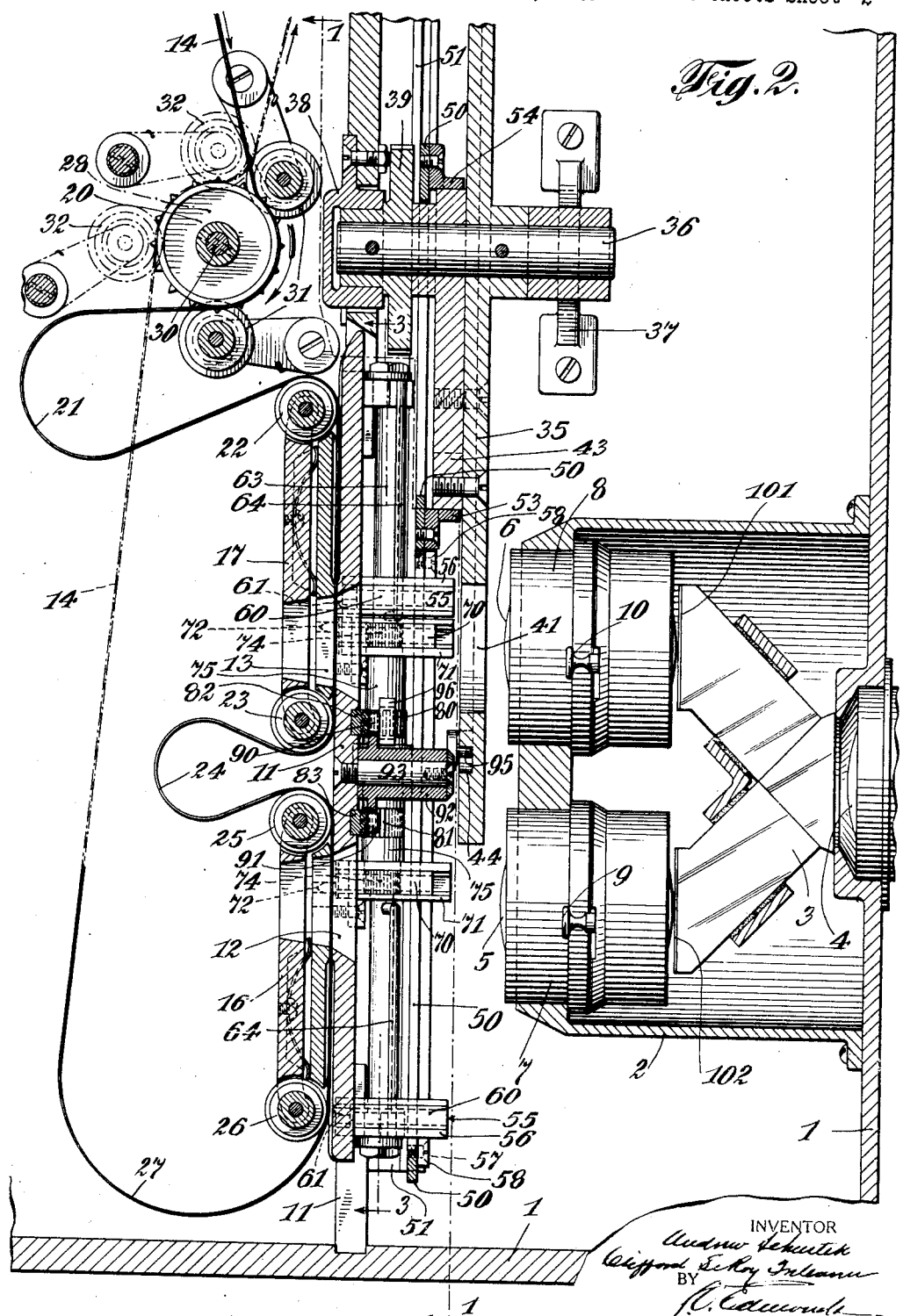
Figure 3:
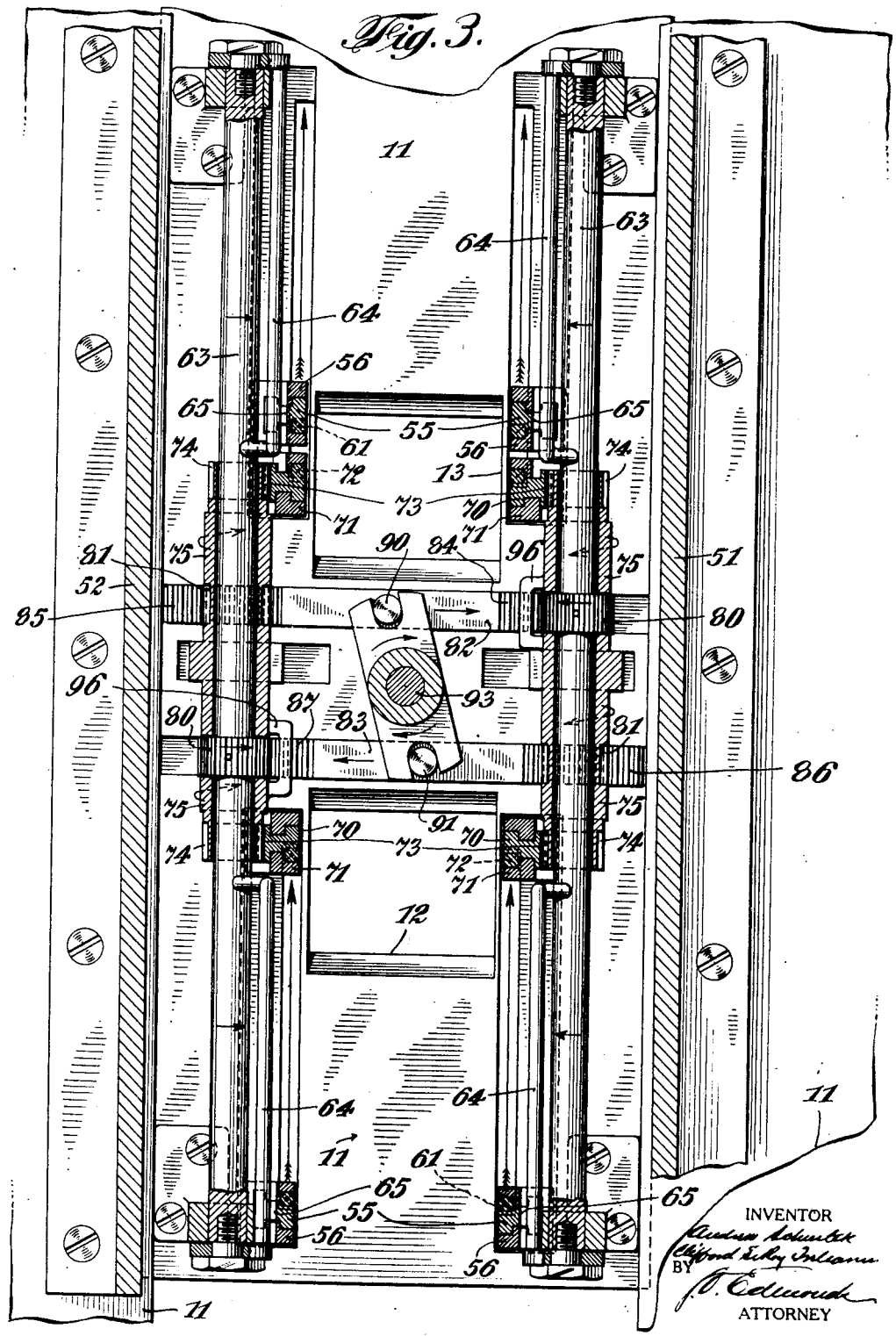
Figure 4:
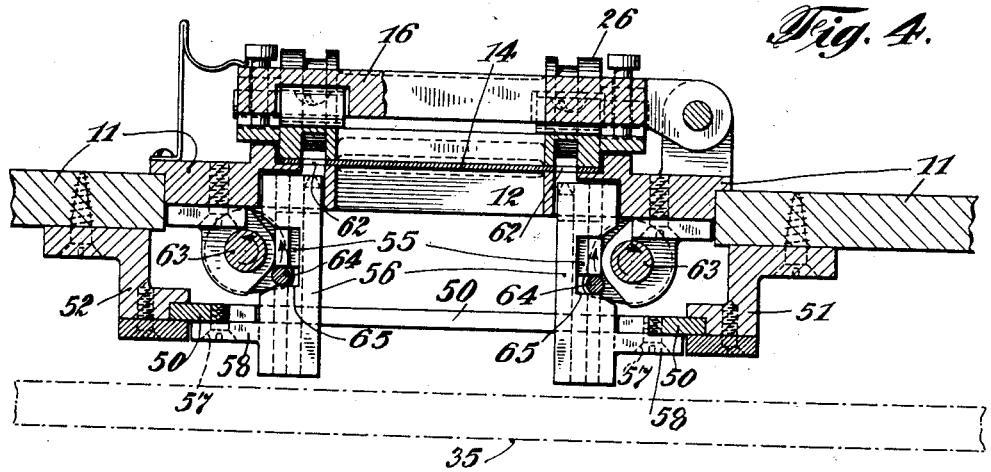
Figure 5:
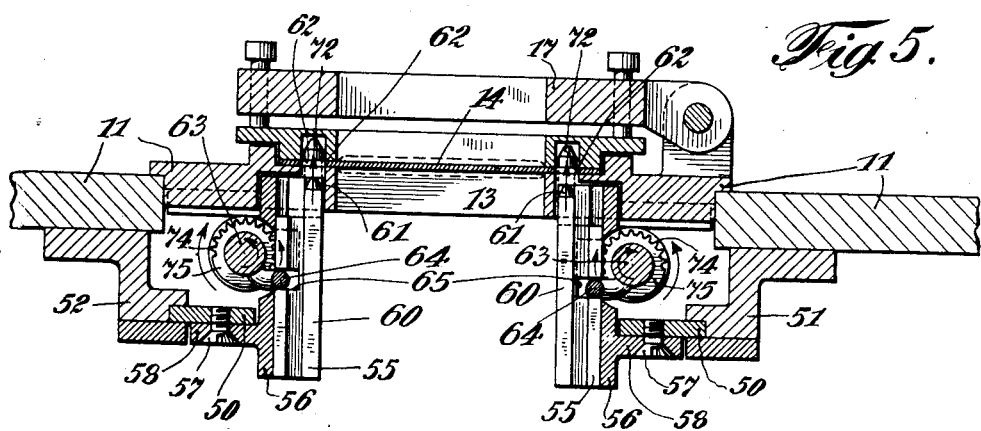
Figure 9:
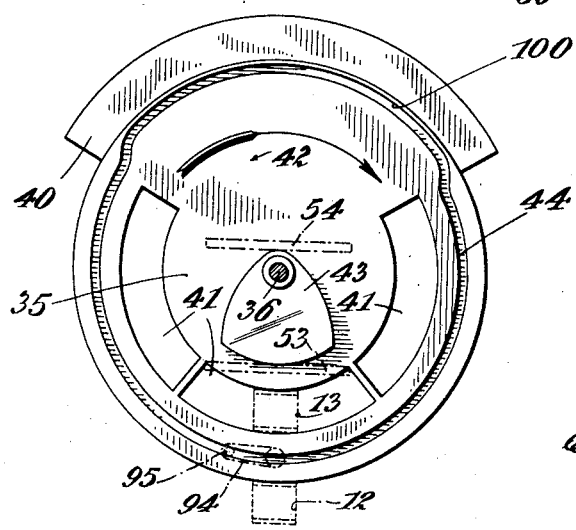
Figure 6:
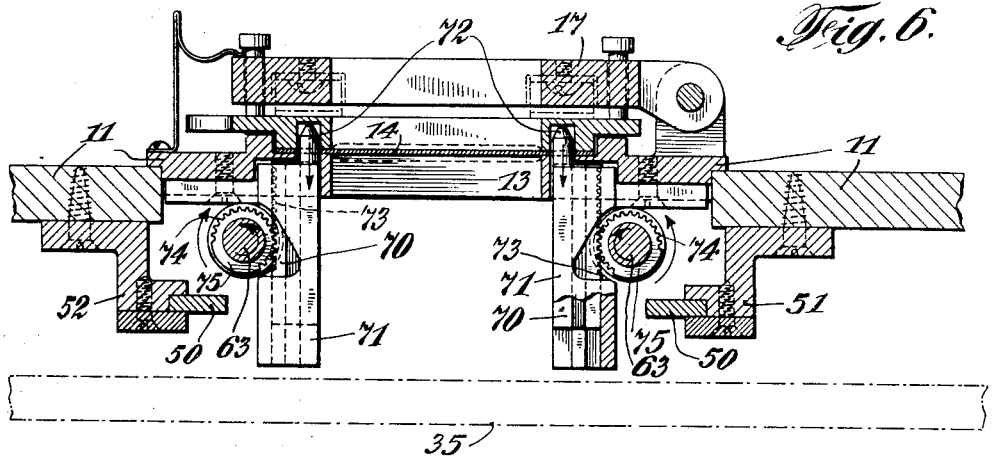
Figure 7:
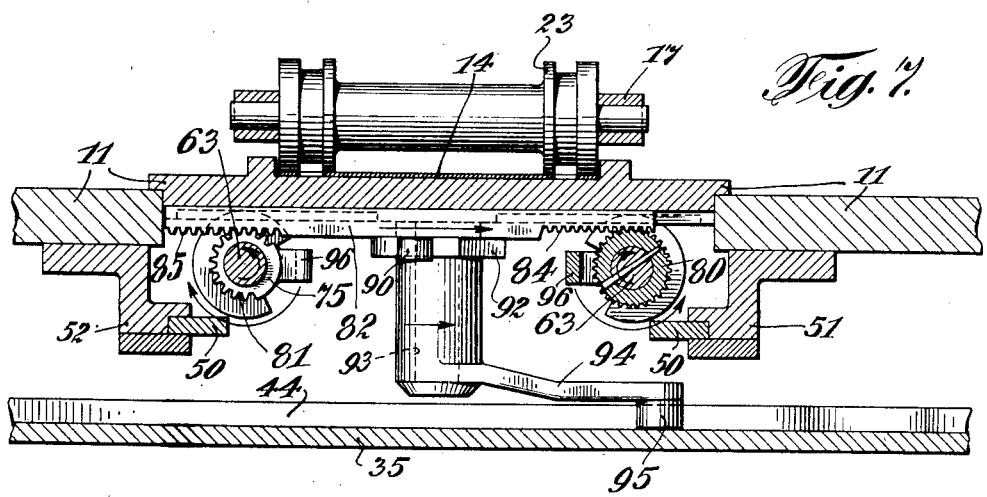
Figure 8:
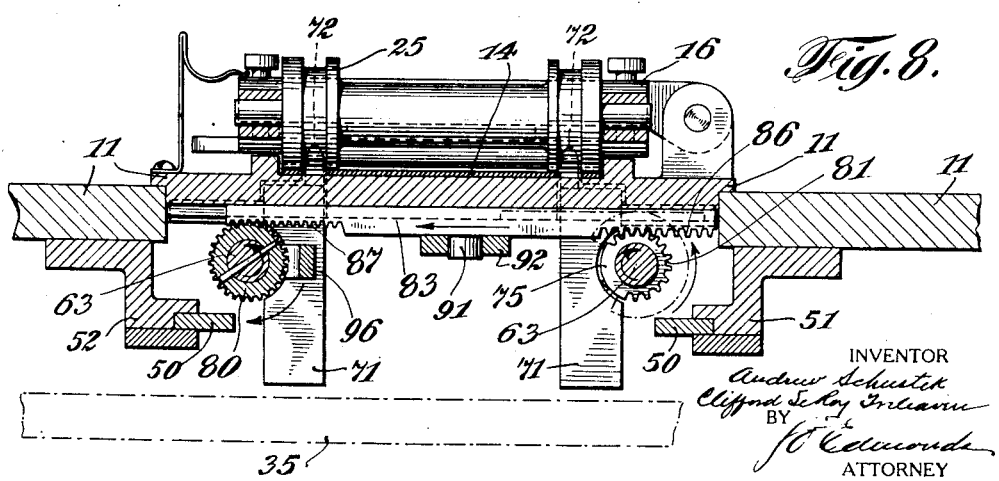

Referring to the drawings, Fig. 1 is a sectional view of a portion of a color motion picture camera embodying our invention, and is taken on the line 1—1 of Fig. 2; Fig. 2 is a sectional view thereof, and is taken on the line 2—2 of Fig. 1; Fig. 3 is an enlarged sectional view of a fragment of the construction, and is taken on the line 3—3 of Fig. 2; Fig. 4 is an enlarged sectional view of a fragment of the construction, showing the feed pin mechanism, and is taken on the line 4—4 of Fig. 1; Fig. 5 is an enlarged sectional view of a fragment of the construction, showing part of the feed pin mechanism, and is taken on the line 5—5 of Fig. 1; Fig. 6 is an enlarged sectional view of a fragment of the construction, showing the register pin mechanism, and is taken on the line 6—6 of Fig. 1; Fig. 7 is an enlarged sectional view of a fragment of the construction, showing the camera and associated parts for moving the feed pins and register pins into and out of engagement with the film, this view being taken on the line 7—7 of Fig. 1; Fig. 8 is an enlarged sectional view through another portion of this part of the construction, and is taken on the line 8—8 of Fig. 1; Fig. 9 is a diagrammatical elevational view of the shutter and cam element, looking toward the front of the camera; Fig. 10 is a sectional view showing a modified camera construction; and Fig. 11 is a sectional view thereof, and is taken on the line 11—11 of Fig. 10.

Similar reference characters refer to similar parts throughout the several views of the drawings.

Referring to the drawings, the camera comprises a suitable box or casing 1, on the front face of which is mounted a suitable housing 2, containing a prism device 3 which divides the beam of light from the object field entering the camera aperture 4 into two approximately equal portions, and directs each portion through one of a pair of parallel lenses 5 and 6, which are spaced apart a distance of 50 millimeters, and are each equipped with standard mountings 7 and 8, including standard iris diaphragms, which may be adjusted by the usual finger pieces 9 and 10.

The prism device 3 illustrated is similar to the prism device described and claimed in an application filed by Clifford Le Roy Treleaven June 2, 1926, Serial No. 113,316, issued December 25, 1928, Patent No. 1,696,739 for color photography, and reference to said application is made hereby. Accordingly, the present camera is endowed with all the advantages and improvements of said prism arrangement; including wide covering power, due to the short light paths between the camera aperture 4 and the lenses, and the formation of sets of geometrically like images with very small loss of light due to back reflection, absorption, or other causes, and other features fully brought out in said application.

The camera is provided with suitable framework or supporting members 11, establishing two exposure apertures or gates 12 and 13, one opposite each of said lenses, and providing the passageway for the film 14. Associated with the frame at each aperture is a pressure plate, 16, 17, of standard construction, which holds the film flat across the adjacent aperture, but permits the film to be moved intermediate the pressure plates and the gate portion of the framework. The film is carried in the camera in the conventional manner (not shown) on a suitable reel, from which the film passes over a standard driving sprocket 20, is formed into a loop, as at 21, passes over the upper guide roller 22 of the upper pressure plate member 17, thence across the aperture 13 and around the lower guide roller 23 of this pressure plate. The film then forms a loop, as at 24, and then passes over the upper guide roller 25 of the lower pressure plate 16, thence past the aperture 12 and around the lower guide roller 26 of the pressure plate 16, then into a loop, as at 27, from whence the film engages a take-up sprocket 28 and passes onto a conventional take-up reel (not shown).

One of the most salient features of the camera is the provision of the film loop 24 intermediate the two exposure apertures 12 and 13, this loop comprising any even number of picture spaces, and being maintained throughout the exposure of the entire film strip.

The feed and take-up sprockets 20 and 28 may be mounted for rotation on the main drive shaft 30 of the camera. Pressure rollers 31 hold the film in contact with the teeth of the feed sprocket 20, and pressure rollers 32 hold the film in engagement with take-up sprocket 28.

Within the box of the camera is a shutter and cam disk 35 mounted on a shaft 36 for rotation therewith. This shaft is journaled on suitable brackets 37 and 38, and has a pinion 39 connected by suitable gearing (not shown) to the main drive shaft 30 of the camera, so that the shutter and cam element will rotate when the drive shaft is turned. This shutter and cam element has an arcuate shutter flange 40 extending for a distance about its periphery. This flange is positioned to come opposite the aperture 12, and to close the aperture for a predetermined time during each revolution of disk 35. The aperture 12 is unobstructed by the shutter for the remaining portion of its rotation. The shutter disk 35 is provided with openings 41 and an opaque shutter portion 42 for the aperture 13, arranged concentrically about the axis of the shutter. These openings and the opaque portion are positioned to come opposite the aperture 13, so that this aperture will be closed when the portion 42 moves across the same, but will be opened when the openings 41 pass by. The shutter disk 35 is adapted to open and close the apertures 12 and 13 simultaneously.

A cam element 43 is mounted on the rear of the disk 35 for rotation therewith. An endless cam track 44 is also provided on the rear surface of the disk 35 about its axis of rotation. The cam 43 reciprocates the feed pins along the length of the film to effect the forward feed of the film at predetermined times. The cam track 44 reciprocates the feed pins and the register pins into and out of engagement with the film at predetermined times.

The film is fed past and registered at each aperture 12 and 13 separately and independently. This requires a separate set of feed pins for each aperture and a separate set of registration pins for each aperture.

The feed mechanism will now be described. A slide plate 50 is mounted for reciprocation in guideways provided on stationary brackets 51 and 52 secured to the camera frame 11 along each edge of the film path. This plate has a central aperture, so that it will not obstruct the apertures 12 and 13. This slide plate 50 has two cam plates 53 and 54 secured thereto, between which the cam 43 fits snugly, so that the slide plate will be raised and lowered in a predetermined manner by the cam 43 as it revolves. At each aperture is a pair of feed pins 55, one at each edge of the film, adapted to engage in the perforations of the film. Each feed pin 55 is slidably contained in a housing 56, which is secured to the slide plate, as by means of a screw 57, which fastens a lug 58 of the housing to the slide plate. Each pin comprises a body portion 60 and a tooth or point portion 61. The tooth portion is adapted to engage the perforations 62 of the film. Along each edge of the film is a shaft 63 journaled in the camera, and each shaft has an offset rod 64, which engages in a recess 65 of the feed pins 60. Each feed pin at each aperture is engaged by one of these rods 64. The feed pins, together with their housings, slide up and down these rods as the slide plate 50 reciprocates. The shafts 63 function to take the feed pins into and out of engagement with the film. This is accomplished by rotating the shafts 63 back and forth. These movements are accomplished in synchronism with the movement of the registration pins, and with the movement of the shutter disk 35.

There are two registration pins at each aperture, one on each side thereof, adapted to engage the perforations of the film strip. Each registration pin 70 is mounted in a housing 71 for reciprocation toward and from the film, each housing being rigidly secured to the frame of the camera. Each registration pin has a body portion and a point or tooth portion 72. This point portion is movable into and out of engagement with the perforations in the film. The body of each registration pin has a rack 73 in constant mesh with gear teeth 74 provided on a sleeve 75, which rotatably encircles one of the shafts 63. There is one sleeve 75 on each shaft 63, and each sleeve actuates one registration pin at each aperture. The feed pins are reciprocated into and out of engagement with the film in synchronism with the movement of the feed pins, and with the movement of the shutter disk 35.

The mechanism for accomplishing the synchronized movement of the feed and registration pins and the shutter disk 35 will now be described. Each shaft 63 has a gear 80, and each sleeve 75 has a gear 81 opposite the gear 80 of the opposite shaft. Rack members 82 and 83 are slidably supported in the frame, and at their opposite ends have teeth meshing with these oppositely disposed gears 80 and 81. Accordingly, rack member 82 has at one end teeth 84 meshing with gear 80 on one shaft 63, and has at its opposite end teeth 85 meshing with gear 81 on the sleeve 75, which encircles the opposite shaft 63. Similarly, rack 83 has at one end teeth 86 meshing with gear 81 of the other sleeve 75, and has at its other end teeth 87 meshing with the other gear 80. Each of these rack members has a pin, 90, 91, which are engaged in recesses at opposite ends of a bridging yoke member 92, which is centrally pivoted on a pin 93 secured to the framework of the camera. This yoke member is reciprocated by means of an arm 94, which is connected therewith, this arm having a roller 95, which is constantly seated in the cam groove 44 of the shutter element 35, so that the arm 94 and yoke 92 will be rocked as the disk 35 revolves.

Each sleeve 75 is cut away at the gear 80, to allow this gear to be pinned to the shaft 63, and here each sleeve has a bridge portion 96, whereby the portions of the sleeves on opposite sides of the gears 80 are integrally connected.

The cam groove 44 is so shaped that the arm 94 and yoke 92 will be in one position when the opaque portions of the shutter are passing across the exposure apertures 12 and 13, and that arm 94 and yoke 92 will be held in another position when the remainder of the shutter is passing across the exposure apertures 12 and 13. As the yoke 92 turns on its pivot, the rack members 82 and 83 will be reciprocated in directions opposite to each other. This movement will cause the shafts 63 to rotate in opposite directions, but on account of the fact that the rods 64, which are secured to these shafts, engage the feed pins from opposite directions, such opposite rotation of the shafts 63 will cause the opposite feed pins to move in the same direction; that is, simultaneously either into engagement with the film or out of engagement therewith. Similarly, reverse movement of the reciprocating rack members 82 and 83 will cause the sleeves 75 to rotate in opposite directions, but on account of the fact that the sleeves engage the registration pins from opposite directions, such opposite rotation of the sleeves will cause the opposite registration pins to move in the same direction; that is, simultaneously either into engagement with the film or out of engagement therewith.

It is, of course, apparent that as the shutter element 35 rotates, not only are the feed and register pins taken into and out of engagement with the film, by reason of the engagement of the cam roller 95 in the cam groove 44, but also the slide plate 50 is reciprocated, by reason of the engagement of the cam element 43 with the cam strips 53 and 54 of the slide plate. Accordingly, the reciprocation of the feed pins in a direction longitudinally of the film in synchronized with the reciprocation of the feed pins and registration pins in a direction transversely of the film.

The operation is as follows: When the cam 43 is in the position shown in Fig. 9, the slide plate 50 is in its furthest forward position in the direction in which the film is traveling. The cam roller 95 being engaged in that portion of the cam groove 44 which is concentric with the portions of the shutter which uncover the apertures 12 and 13, the feed pins will be out of engagement with the film, but the registration pins will be engaging in the perforations of the film at each aperture. As the shutter turns, for instance, in the direction of the arrow indicated in Fig. 9, the slide plate is caused to rise, carrying the feed pins upwardly while they are maintained out of engagement with the film. When the cam has taken the slide to the opposite extremity of its movement, the cam 43 presents a surface which maintains the slide in this position until the registration pins have been disengaged from the film and the feed pins have been engaged therewith. This reciprocation of the feed and register pins is effected by the roller 95 riding up on a portion 100 of the cam track, which is disposed further from the axis of the shutter than is the portion of the groove first mentioned. Just before the register pins are taken out of engagement with the film, the covering portions 40 and 42 of the shutter begin to cover the apertures 12 and 13. As these covering portions pass apertures, the cam 43 moves the slide plate in the direction of the travel of the film through the camera, and since, during this movement, the feed pins are in engagement with the film and the registration pins are out of engagement with the film, this movement of the slide plate advances the film across both apertures 12 and 13 separately. The amount of each intermittent advance is preferably two picture spaces. Just before the covering portions of the shutter unmask the apertures 12 and 13, the cam roller 94 slides off the outer groove portion 100 onto the more inward portion, and consequently the feed pins are taken out of engagement with the film and the registration pins are brought into engagement therewith to register the film at each aperture 12 and 13 separately and independently, so that the images obtained at each aperture will all have exactly the same position with respect to a corresponding pair of perforations on the film. Stating the method of operation more briefly: The feed pins, moving with and also on the slide plate, advance the film two picture spaces at a time across each aperture 12 and 13, separately and independently, into approximately the desired position, and then release the film, whereupon the register pins register each film space at each aperture separately and independently in precise position to receive the images, transmitted through the prism and lenses, in the desired uniform relationship to similar registration perforations on the film adjacent to each registered film space. By maintaining a free loop in the film intermediate the exposure apertures 12 and 13, there is no resistance to the registration pins adjusting the picture spaces of the film separately and independently at each aperture to cause the images to be impressed on the film in exact uniform relationship with respect to certain corresponding perforations of the film.

It will be readily apparent that a film having the images registered with such exact uniformity with respect to perforations of the film permits exact superposed registration of the component part images of each set, either on the same side or on opposite sides of a positive film, by contact or by optical printing, or a separate positive strip may be made for each color, with the images on such strips having precisely uniform and like registration to corresponding perforations on the film, so that complemental images may be projected from the two strips in exact superposed registration with each other.

By means of the prism device, the images of each set are exactly geometrically alike, and are taken along optically like paths simultaneously from the same point of view.

It is understood, of course, that suitable color filters are associated with the lens and prism system. A blue green filter 101 may be placed at one of the emergent faces of the prism 3, and an orange red filter 102 may be placed at the other emergent face of the prism. Suitable gearing, or other mechanism, is provided for operating the camera, either electrically or mechanically.

In the form of camera above described, the two apertures 12 and 13 are parallel with each other and the images at these apertures are taken in the same plane. Our invention, however, is also applicable to a camera in which the images at the apertures are taken in planes at right angles to each other. We have illustrated in Figs. 10 and 11 a camera embodying this modification.

In this modified form of camera, the camera case 110 has an opening 111, in which is disposed an objective lens 112. Behind lens 112 is a device 113, which divides the light beam coming through the lens 112 into two approximately equal parts and directs the part beams in separate paths at right angles to each other. Device 113 is mounted on suitable framework 114 in the camera. This device 113 may comprise a grid-like structure, having bars 115 with intermediate openings or slits 116. The surfaces of the bars facing the lens 112 are highly polished or are silvered, to provide mirror surfaces, and are positioned at an angle of 45° to the axis of the incident light beam. These surfaces are adapted to reflect approximately one-half of the beam coming through lens 112 at right angles to the incoming path. The slits or apertures 116 occupy approximately the same area as the mirror surfaces of the bars 115, so that the other half of the light beam coming through lens 112 will continue straight through the device 113 without obstruction or deflection. The beam having been focused by the lens 112, the two part beams will come into focus at the same distances from the lens 112 but in planes at right angles to each other.

The camera includes a gate 117, provided with an aperture 118 for positioning a film strip for exposure at the focus of the deflected part beam. In combination with this gate 117 is a pressure plate 119, of standard form. If desired, a suitable filter 120, such as blue green, may be positioned in the gate 117 across the aperture 118. For the other focused part image there is provided a complementary plate 121, having an aperture 122 and a filter 123, which may be orange red, and a cooperating pressure plate 124. Film 125 is fed between a usual feed sprocket 126 and cooperating pressure roller 127 across the aperture 118. A loop 128 is formed and maintained in the film intermediate the roller 129 on pressure plate 119 and the roller 130 on pressure plate 124, these rollers and plates being adjacent each other in the neighborhood of the line of meeting of the two planes in which the focused images are positioned. The film then passes between the gate 121 and pressure plate 124 and into engagement between a take-up sprocket 131 and pressure roller 132. The feed and take-up reels may be of conventional construction and arrangement, and accordingly it is not deemed necessary to describe or illustrate them in detail.

The film is fed across each of the apertures simultaneously, with intermittent motion, and the respective picture spaces are registered at each aperture. The feed and registration at each aperture is separate and independent of the feed and registration at the other aperture, in view of the loose film loop intermediate these apertures. The feed and registration are accomplished by means of a sprocket 133, which is positioned close to the ends of the gates 117 and 121, which are adjacent each other. This sprocket has a series of teeth 134 around each edge, which engage in the lines of perforations on opposite edges of the film 125. The teeth of this sprocket 133 engage a part of the film at the end of gate 117 before it enters the loop 128, and at the same time engages the film at the entering end of the gate 121 after it leaves the loop 128. The teeth of this sprocket 133 continuously mesh in the perforations of the film at both of these locations. This sprocket 133 is mounted for rotation on a shaft 135, and is driven by means of a Geneva gear 136, star wheel 137 and a gear 138 which rotates with the star wheel and meshes with a gear 139 pinned to shaft 135. The gear 138 is preferably twice as large as the gear 139, so that upon each quarter revolution of the star 137, the sprocket 133 will be given a rotation of 180°.

Each set of teeth on the sprocket 133 includes four teeth 140 larger than the rest. These teeth quarter the periphery of the sprocket at each side. The enlarged teeth serve to register the film at each aperture separately and independently of the registration at the other aperture. The arrangement is such that when the film is at rest at each aperture and during the exposure interval, two of these registration teeth will engage opposite edges of the film at each aperture. When the exposure has been made and the shutter (not shown) intercepts the light beam in the camera, the Geneva gear causes sprocket 133 to rotate 180°. This turning of the sprocket obviously will carry the film past each aperture a distance equal to one-half the periphery of the sprocket 133. Preferably, this distance is two picture spaces on the film. During this rotation, not only the register teeth but also the intermediate teeth serve to feed the film forwardly. The registration teeth are large enough to completely fill the perforations on the film, so that every image at each aperture will have exactly the same registration and position with respect to a pair of adjacent perforations on the film as every other image will have to corresponding set of adjacent perforations.

It will be noted that in this modification, as well as in the former, the formation of the film loop 128 intermediate the exposure apertures permits the separate and independent registration of the film and images on the film at each aperture.

It will be noted that in each of the modifications described, shrinkage or elongation of the film cannot interfere with the obtaining of proper registration at each gate, since the effect of any variation in the length of the film will merely cause the loop between the apertures to be longer or shorter, and the film will still be free at each aperture for placement in exact position for the precise uniform registration of the image thereon.

In both forms of cameras above described, it will be noted that at each gate the film is registered both crosswise and lengthwise of the film by means of two registration pins, or teeth, which fill the perforations of the film both crosswise and lengthwise, and that each image is registered with exactly the same correspondence to exactly corresponding adjacent perforations of the film. When the light-splitting device has been properly oriented, so that the images at the apertures have exactly the same relative position to the respective registration pins, no further adjustment is necessary, as all subsequent images will have exactly the same relative location on the film with respect to the corresponding perforations, for any object photographed from any distance.

It will also be noted that with cameras as above described, full covering power of the lens or lenses is maintained to the extreme corners of the object field within the range of the lens system. Full definition of the lens is maintained in either case.

As many changes could be made in the above construction and as many apparently widely different embodiment of this invention could be made without departing from the scope thereof, it is intended that all matter contained in the above description or shown in the accompanying drawings shall be interpreted as illustrative and not in a limiting sense.

What we claim is:—

1. In a camera of the character described having a single lift aperture, in combination, optical means related to said aperture for obtaining two geometrically like images simultaneously at focal plane areas spaced apart, separate means at each focal plane for intermittently advancing a film strip through said focal plane areas simultaneously, and means for maintaining a free lop of film intermediate said focal plane areas during said advancing of the film.

2. In a camera of the character described having a single light aperture, in combination, optical means related to said aperture for obtaining two geometrically like images simultaneously at focal plane areas spaced apart, individual means at each focal plane for intermittently advancing a film strip through said focal plane areas simultaneously, means for maintaing a free loop of film intermediate said focal plane areas during said advancing of the film, and means for registering the film strip separately and independently at each focal plane area.

3. In a camera of the character described having a single light aperture, in combination, optical means related to said aperture for obtaining two geometrically like images simultaneously at focal plane areas spaced apart, individual means at each focal plane for intermittently advancing a film strip through said focal plane areas simultaneously and means for maintaining a free loop of film intermediate said focal plane areas during the advance of the film, said focal plane areas being parallel with each other.

4. In a camera of the character described having a single light aperture, in combination, optical means related to said aperture for obtaining two geometrically like images simultaneously at focal plane areas spaced apart, individual means at each focal plane for intermittently advancing a film strip through said focal plane areas simultaneously, and means for maintaining a free loop of film intermediate said focal plane areas during the advance of the film, said focal plane areas being parallel to each other and spaced apart a distance of approximately fifty millimeters.

5. In a camera of the character described, in combination, film gate means providing two exposure apertures spaced apart, adapted to operatively cooperate with a single film strip, means individual to each aperture intermittently engaging the film to advance the film past said apertures simultaneously with like intermittent motion, means individual to each aperture for registering portions of the film strip simultaneously at each aperture when disengaged by said feed means, and means for maintaining a free loop in the film intermediate said apertures.

6. In a camera of the character described, in combination, film gate means providing two exposure apertures spaced apart, adapted to operatively cooperate with a single film strip, means individual to each aperture intermittently engaging the film to advance the film past said apertures simultaneously with like intermittent motion, means individual to each aperture for registering portions of the film strip simultaneously at each aperture when disengaged by said feed means, means for maintaining a free loop in the film intermediate said apertures, and means synchronizing the operation of said feed means with the operation of said registering means.

7. In a camera of the character described, in combination, film gate means providing two exposure apertures spaced apart, adapted to operatively cooperate with a single film strip, means individual to each aperture intermittently engaging the film to advance the film past said apertures simultaneously with like intermittent motion, means individual to each aperture for registering portions of the film strip simultaneously at each aperture when disengaged by said feed means, means for maintaining a free loop in the film intermediate said apertures, and means for photographing geometrically like images simultaneously on said film strip at both of said apertures when the film is held in registry at said apertures by said registering means.

8. In a camera of the character described, in combination with, a film strip of, means for obtaining successive pairs of simultaneous geometrically like images at separate focal plane areas spaced apart approximately fifty millimeters, means for intermittently advancing the film strip through said focal plane areas, said means moving a film a distance of at least two picture spaces on each advance of the film, and means for maintaining slack in the film intermediate said focal plane areas.

9. In a camera of the character described, in combination, gate means providing two exposure apertures spaced apart, a slide plate common to both apertures, feed pins individual to each aperture mounted on the slide plate for movement therewith and thereon, registration pins individual to each aperture, stationary supports for said registration pins, and means for reciprocating said slide plate, for reciprocating the feed pins with respect to the slide plate, and for reciprocating the registration pins on their stationary supports.

10. In a camera of the character described, in combination, gate means providing two exposure apertures spaced apart, a slide plate common to both apertures, feed pins individual to each aperture mounted on the slide plate for movement therewith and thereon, registration pins individual to each aperture, stationary supports for said registration pins, and means for reciprocating said slide plate, for reciprocating the feed pins with respect to the slide plate, and for reciprocating the registration pins on their stationary supports, said means including a rotatable member connected with said slide plate, with said feed pins, and with said registration pins.

11. In a camera of the character described, in combination, gate means providing two exposure apertures spaced apart, a slide plate common to both apertures, feed pins individual to each aperture mounted on the slide plate for movement therewith and thereon, registration pins individual to each aperture, stationary supports for said registration pins, and means for reciprocating said slide plate, for reciprocating the feed pins with respect to the slide plate, and for reciprocating the registration pins on their stationary supports, said means including a rotatable member having a cam connected with said slide plate and having a cam groove connected with said feed pins and said registration pins.

12. In a camera of the character described, in combination, gate means providing two exposure apertures spaced apart, a slide plate common to both apertures, feed pins individual to each aperture mounted for movement on the slide plate, rotatable shafts having offset portions on which the feed pins are slidably engaged, and means for rotating said shafts back and forth to reciprocate said feed pins on said slide plate.

13. In a camera of the character described, in combination, gate means providing two exposure apertures spaced apart, a slide plate common to both apertures feed pins individual to each aperture mounted for movement on the slide plate, rotatable shafts having offset portions on which the feed pins are slidably engaged, and means for rotating said shafts back and forth to reciprocate said feed pins on said slide plate, said means including a rotatable member having a cam groove and connections between said cam groove and said shafts.

14. In a camera of the character described, in combination, gate means providing two exposure apertures spaced apart, a slide plate common to both apertures, feed pins individual to each aperture mounted for movement on the slide plate, rotatable shafts having offset portions on which the feed pins are slidably engaged, and means for rotating said shafts back and forth to reciprocate said feed pins on said slide plate, said means including a toothed member on each shaft, two rack members each engaging one toothed member, a pivoted yoke connecting said rack members for simultaneous reciprocation in opposite directions, a rotatable member having a cam groove, and a connection between said cam groove and said yoke whereby the yoke is reciprocated upon rotation of said rotatable member.

15. In a camera of the character described, in combination, gate means provided two exposure apertures spaced apart, stationary registration pin supports at each aperture, a registration pin movable in each support, a rotatable member positioned along each side of said apertures and connected to pins at both apertures, whereby said pins are reciprocated on their supports when said rotatable members are rotated back and forth, and means for rotating said rotatable members to reciprocate said registration pins, said means including toothed members on said rotatable members, rack members engaging said toothed members, a yoke connecting said rack members for reciprocating them in opposite directions, and cam mechanism connected with said yoke for reciprocating the same.

This specification signed this 29th day of June, 1926.

ANDREW SCHUSTEK.

This specification signed this 29th day of July, 1926.

CLIFFORD LE ROY TRELEAVEN.